United States Patent
Chen

(10) Patent No.: US 8,503,627 B2
(45) Date of Patent: Aug. 6, 2013

(54) COMMUNICATION DEVICE, METHOD OF OPERATING THE SAME, AND COMMUNICATION SYSTEM

(76) Inventor: Shao-Pou Chen, Taipei (TW)

(*) Notice: Subject to any disclaimer, the term of this patent is extended or adjusted under 35 U.S.C. 154(b) by 195 days.

(21) Appl. No.: 13/168,460

(22) Filed: Jun. 24, 2011

(65) Prior Publication Data

US 2011/0317822 A1    Dec. 29, 2011

Related U.S. Application Data

(60) Provisional application No. 61/358,931, filed on Jun. 27, 2010.

(51) Int. Cl.
*H04M 11/00*    (2006.01)

(52) U.S. Cl.
USPC ............................. 379/93.17; 379/93.23

(58) Field of Classification Search
USPC ................... 379/93.17, 93.23, 93.25
See application file for complete search history.

(56) References Cited

U.S. PATENT DOCUMENTS

| | | | |
|---|---|---|---|
| 8,116,723 B2* | 2/2012 | Kaltsukis | 455/404.2 |
| 2009/0119136 A1* | 5/2009 | Colson et al. | 705/7 |
| 2010/0208876 A1 | 8/2010 | Tsuei | |
| 2011/0105087 A1* | 5/2011 | Toebes et al. | 455/412.1 |
| 2012/0220314 A1* | 8/2012 | Altman et al. | 455/456.3 |

FOREIGN PATENT DOCUMENTS

WO    WO 2007/083926 A1    7/2007

* cited by examiner

*Primary Examiner* — Creighton Smith
(74) *Attorney, Agent, or Firm* — Moser Taboada

(57) ABSTRACT

A communication device includes a call unit, a transmitter, a network transmission unit and a display unit. The call unit can generate a call request based on a phone number of a phone device of a called party. The transmitter can send the call request to the phone device. The network transmission unit is responsive to the call request for acquiring current status information of the called party from at least one social network server through Internet. The display unit can render the current status information.

18 Claims, 2 Drawing Sheets

COMMUNICATION DEVICE, METHOD OF OPERATING THE SAME, AND COMMUNICATION SYSTEM

RELATED APPLICATIONS

This application claims priority to U.S. Provisional Application Ser. No. 61/358,931, filed Jun. 27, 2010, which is herein incorporated by reference.

BACKGROUND

1. Technical Field

The present disclosure relates to communication, and more particularly, real-time communication.

2. Description of Related Art

Since the invention of the communication techniques, the mobile phone has experienced continued rapid growth due to continuous improvements.

Caller ID technology has been developed and still been using in the current market for a long time. Consumers have been enjoying the benefit of this technology of seeing who's calling before answering a phone call. Based on the caller ID technology, while one person, namely calling party, is making a call to another person, namely called party, the calling party's phone number is displayed on the called party's phone screen. However, the phone number information is static and do not provide extended information to help both parties to further know each other well. Such information also does not help to improve both parties' communication quality.

In view of the foregoing, there is an urgent need in the related field to provide real-time communication techniques.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one or more various aspects, the present disclosure is directed to real-time communication techniques.

According to one embodiment of the present invention, a communication device includes a call unit, a transmitter, a network transmission unit and a display unit. The call unit can generate a call request based on a phone number of a phone device of a called party. The transmitter can send the call request to the phone device. The network transmission unit is responsive to the call request for acquiring current status information of the called party from at least one social network server through Internet. The display unit can render the current status information.

According to another embodiment of the present invention, a method of operating a communication device includes steps as follows. A call request based on a phone number of a phone device of a called party is generated. Then, the call request is sent to the phone device. The next step is to respond to the call request for acquiring current status information of the called party from at least one social network server through Internet. Then, the current status information is rendered.

According to yet another embodiment of the present invention, a communication system includes a first communication device and a second communication device. The first communication device includes a communication device, a call unit, a transmitter, a first network transmission unit and a first display unit. The call unit can generate a call request based on a phone number of a second communication device of a called party. The transmitter can send the call request to the second communication device. The first network transmission unit is responsive to the call request for acquiring first current status information of the called party from at least one social network server through Internet. The first display unit can render the first current status information.

Furthermore, the second communication device includes a receiver, a second network transmission unit and a second display unit. The receiver can receive the call request from the first communication device of a calling party. The second network transmission unit is responsive to the call request for acquiring second current status information of the calling party from the social network server through Internet. The second display unit can render the second current status information.

Technical advantages are generally achieved, by embodiments of the present invention, as follows: Not like the caller ID technology that only provides static information to the called party. Real-time Call Status technology provides dynamic real-time status information to both the calling and called parties.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
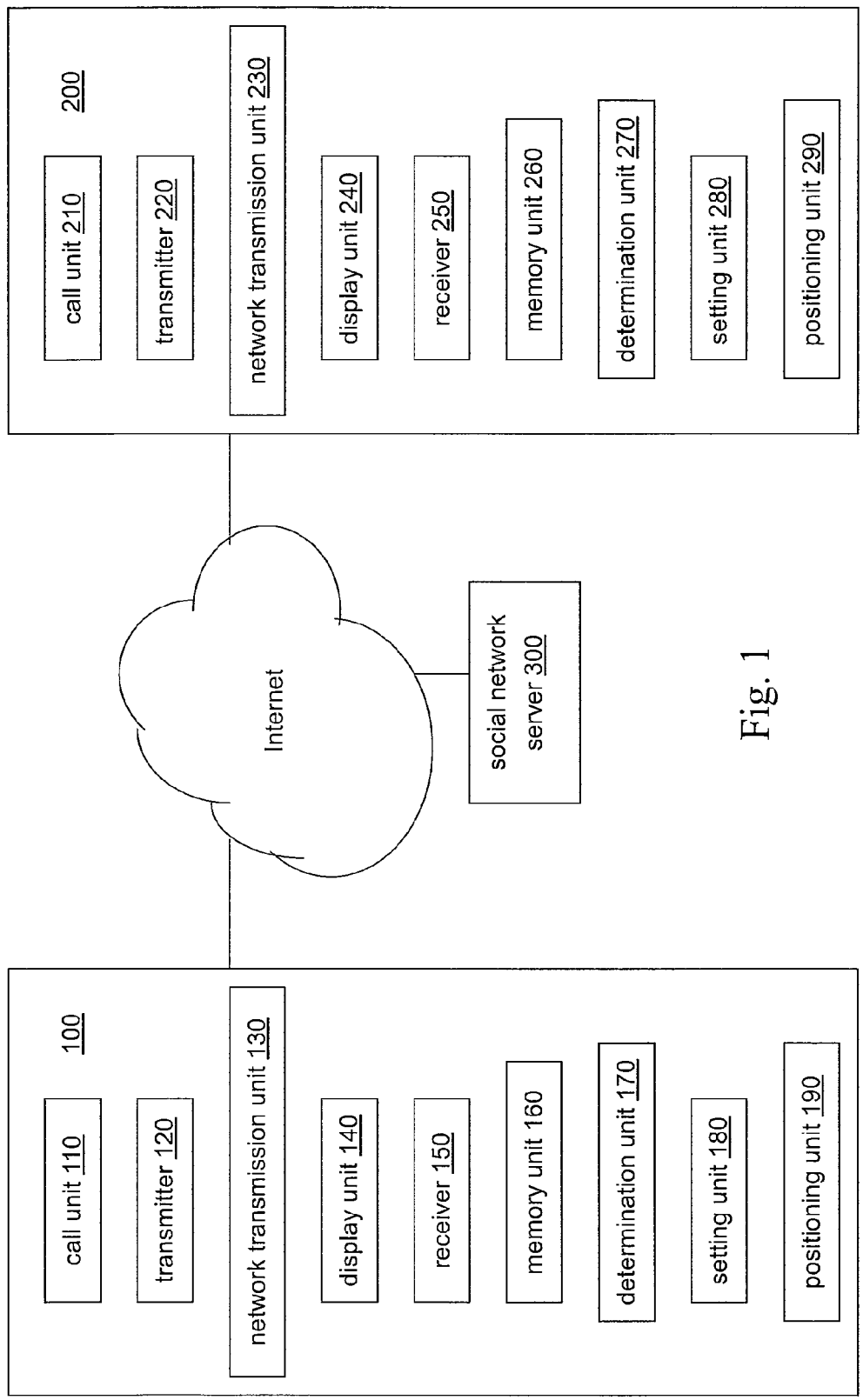
FIG. 1 is a block diagram of a communication system according to one embodiment of the present disclosure.

In the following detailed description, for purposes of explanation, numerous specific details are set forth in order to attain a thorough understanding of the disclosed embodiments. It will be apparent, however, that one or more embodiments may be practiced without these specific details. In other instances, well-known structures and devices are schematically shown in order to simplify the drawing.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments.

As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As shown in FIG. 1, a communication system includes a first communication device 100 and a second communication device 200. In this embodiment, the first communication device 100 in configuration is essentially the same as the second communication device 200. For example, the second communication device 200 may be a phone device or the like.

The communication device 100 includes a call unit 110, a transmitter 120, a network transmission unit 130 and a display unit 140. The call unit 110 can generate a call request based on a phone number of the communication device 200 of a called party. The transmitter 120 can send the call request to the communication device 200. The network transmission unit 130 is responsive to the call request for acquiring current status information of the called party from at least one social network server 300 through Internet, without passing through any additional provision system. The display unit 140 can render the current status information of the called party. In this way, the calling party can know the current status information of the called party when he or she is calling the called party.

The communication device 200 includes a receiver 250, a network transmission unit 230 and a display unit 240. The receiver 250 can receive the call request from the first communication device 100 of a calling party. The network transmission unit 230 is responsive to the call request for acquiring current status information of the calling party from the social network server 300 through Internet, without passing through any additional provision system. The display unit 240 can render the current status information of the calling party. In this way, the called party can know the current status information of the calling party when the called party receives an incoming call.

Then, when called party uses the communication device 200 to accept the call request, the voice communication is established between the two communication devices 100 and 200, so that the calling and called parties can talk to each other.

The communication device 100 further includes a memory unit 160 and a determination unit 170. The determination unit 170 can determine whether the memory unit 160 stores previous status information of the called party, wherein when the memory unit 160 stores the previous status information, the display unit 140 renders the previous status information before the current status information is acquired by the network transmission unit 130.

Additionally or alternatively, the memory unit 160 can store an account of a calling party; for example, the social network server 300 provides a social network website, such as Facebook, Twitter, Google Buzz or the like, and the account is the calling party's ID of the social network website. Furthermore, the communication device 100 further includes a setting unit 180. The setting unit can correlate the phone number of the called party to identification data; for example, the identification data is the called party's ID of the social network website. In use, the social network server 300 authorizes the account, the network transmission unit 130 acquires the current status information of the called party according to the identification data.

The communication device 100 further includes a receiver 150. When the call unit 210 generates a second call request based on a phone number of the communication device 100, and then the transmitter 220 sends the call request to the communication device 100, the receiver 150 receives this call request from the communication device 200, so that the network transmission unit 130 can be responsive to this call request for acquiring the current status information as mentioned above.

In addition, the network transmission unit 130 acquires the current status information periodically. Once setup, the communication device 100 will actively download the most recent status updates in pre-defined time interval without users' further authorization. This can decrease the amount of data being downloaded to the communication device 100 when users place a call or receive a call so that the waiting time to see the most recent status updates is reduced.

Moreover, the network transmission unit 130 can be responsive to the call request for further sending an advertisement link to the phone device through Internet. In this way, the display units 140 and 240 both show the same advertisement, so that the calling and called parties can share the information of the advertisement. The called party sees the advertisement before answering the call. Later the called party can click on the displayed advertisement to explore more detailed information about this advertisement during a call or after the call is completed.

The communication device 100 further includes a positioning unit 190. The positioning unit 190 can calculate positioning data of the communication device 100. The network transmission unit 130 can be responsive to the call request for further sending the positioning data of the communication device 100 to the communication device 200 through Internet. The positioning unit 290 can calculate positioning data of the communication device 200 and further plan a path from the communication device 200 to 100. The network transmission unit 230 can send the positioning data of the communication device 200 and/or the path to the communication device 100. In this way, the display units 140 and 240 both show the location map, so that the calling and called parties can see more detailed information about this location or directions.

In the communication device 100 and/or 200, the call unit, the network transmission unit, the display unit, the memory unit, the determination unit, the setting unit and the positioning unit may be hardware, software, and/or firmware. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

Moreover, in one or more embodiments, any one of abovementioned units may be divided into various sub-units, or one of abovementioned units may be integrated into another. Those with ordinary skill in the art may design these units depending on the desired application.

Figure 2:
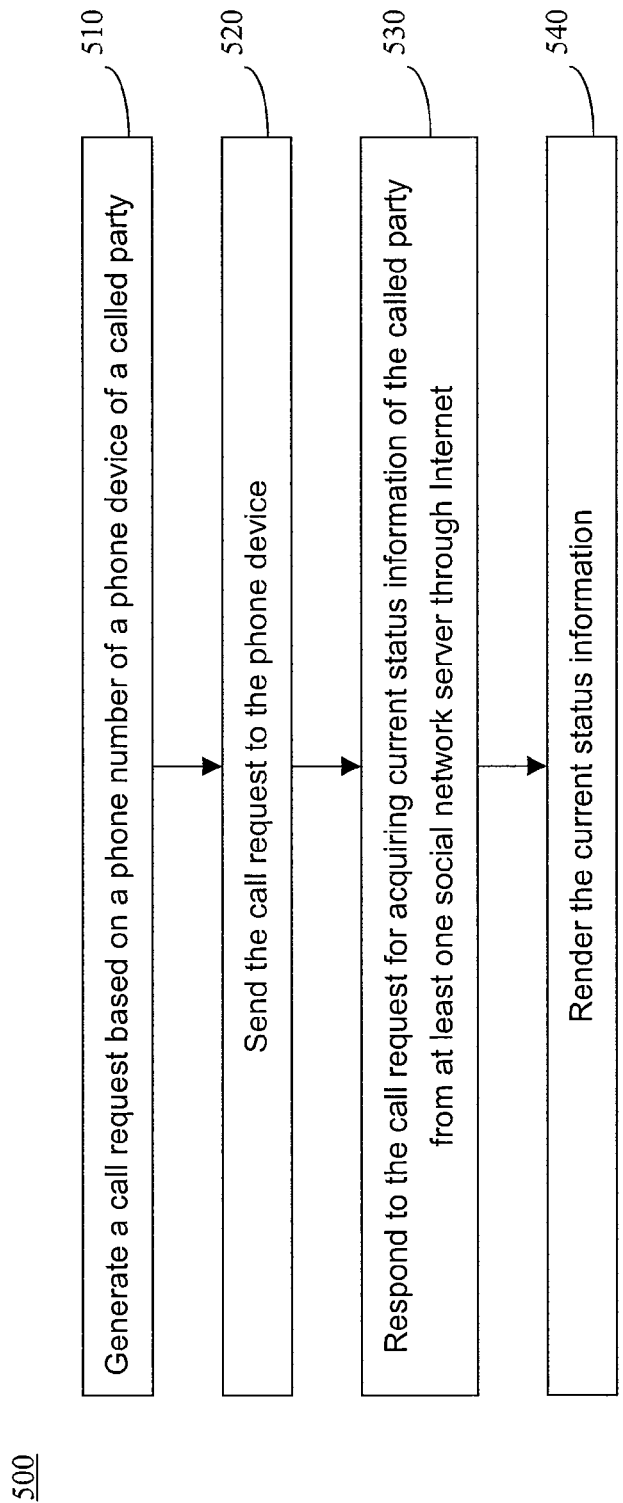
FIG. 2 is a flowchart of a method of operating a communication device according to one embodiment of the present disclosure.

FIG. 2 is a flowchart of a method of operating a communication device (e.g., 100 or 200) according to one embodiment of the present disclosure. As shown in FIG. 2, the method 500 includes steps 510-540 as follows (The steps are not recited in the sequence in which the steps are performed. That is, unless the sequence of the steps is expressly indicated, the sequence of the steps is interchangeable, and all or part of the steps may be simultaneously, partially simultaneously, or sequentially performed). It should be noted that those implements to perform the steps in the method 500 are disclosed in above embodiments and, thus, are not repeated herein.

In method 500, a call request based on a phone number of a phone device of a called party is generated in step 510. Then, the call request is sent to the phone device in step 520. The next step 530 is to respond to the call request for acquiring current status information of the called party from at least one social network server through Internet. Then, the current status information is rendered in step 540.

The method 500 further includes a step of determining whether the communication device stores previous status information of the called party, wherein when the memory unit stores the previous status information, the step 540 includes: rendering the previous status information before the current status information is acquired.

The method 500 further includes a step of storing an account of a calling party, and another step of correlating the phone number of the called party to identification data, wherein when the social network server authorizes the account, the step 130 includes: acquiring the current status information of the called party according to the identification data.

The method 500 further includes a step of receiving a second call request from the phone device, and another step of responding to the second call request acquires the current status information.

Furthermore, the step 130 includes: acquiring the current status information periodically.

The method further includes a step of responding to the call request for further sending an advertisement link to the phone device through Internet.

The method 500 further includes a step of calculating positioning data of the communication device, and another step of responding to the call request for further sending the positioning data to the phone device through Internet.

The reader's attention is directed to all papers and documents which are filed concurrently with his specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims herein is not intended to invoke the provisions of 35 U.S.C. §112, 6th paragraph.

The invention claimed is:

1. A communication device comprising:
   a call unit for generating a call request based on a phone number of a phone device of a called party;
   a transmitter for sending the call request to the phone device;
   a network transmission unit responsive to the call request for acquiring current status information of the called party from at least one social network server through Internet;
   a display unit for rendering the current status information;
   a memory unit for storing an account of a calling party; and
   a setting unit for correlating the phone number of the called party to identification data, wherein when the social network server authorizes the account, the network transmission unit acquires the current status information of the called party according to the identification data.

2. The communication device of claim 1, further comprising:
   a determination unit for determining whether the memory unit stores previous status information of the called party, wherein when the memory unit stores the previous status information, the display unit renders the previous status information before the current status information is acquired.

3. The communication device of claim 1, further comprising:
   a receiver for receiving a second call request from the phone device, so that the network transmission unit is responsive to the second call request for acquiring the current status information.

4. The communication device of claim 1, wherein the network transmission unit acquires the current status information periodically.

5. The communication device of claim 1, wherein the network transmission unit is responsive to the call request for further sending an advertisement link to the phone device through Internet.

6. The communication device of claim 1, further comprising:
   a positioning unit for calculating positioning data of the communication device, wherein the network transmission unit is responsive to the call request for further sending the positioning data to the phone device through Internet.

7. A method of operating a communication device, the method comprising:
   (a) generating a call request based on a phone number of a phone device of a called party;
   (b) sending the call request to the phone device;
   (c) responding to the call request for acquiring current status information of the called party from at least one social network server through Internet;
   (d) rendering the current status information;
   (e) storing an account of a calling party; and
   (f) correlating the phone number of the called party to identification data, wherein when the social network server authorizes the account, the step (c) includes acquiring the current status information of the called party according to the identification data.

8. The method of claim 7, further comprising:
   determining whether the communication device stores previous status information of the called party, wherein when the communication device stores the previous status information, the step (d) includes rendering the previous status information before the current status information is acquired.

9. The method of claim 7, further comprising:
receiving a second call request from the phone device; and
responding to the second call request acquires the current status information.

10. The method of claim 7, wherein the step (c) includes acquiring the current status information periodically.

11. The method of claim 7, further comprising:
responding to the call request for further sending an advertisement link to the phone device through Internet.

12. The method of claim 7, further comprising:
calculating positioning data of the communication device;
responding to the call request for further sending the positioning data to the phone device through Internet.

13. A communication system comprising:
a first communication device comprising:
a call unit for generating a call request based on a phone number of a second communication device of a called party;
a transmitter for sending the call request to the second communication device;
a first network transmission unit responsive to the call request for acquiring first current status information of the called party from at least one social network server through Internet; and
a first display unit for rendering the first current status information,
wherein the second communication device comprises:
a receiver for receiving the call request from the first communication device of a calling party;
a second network transmission unit responsive to the call request for acquiring second current status information of the calling party from the social network server through Internet; and
a second display unit for rendering the second current status information.

14. The communication system of claim 13, wherein the first communication device further comprises:
a memory unit; and
a determination unit for determining whether the memory unit stores previous status information of the called party, wherein when the memory unit stores the previous status information, the first display unit renders the previous status information before the first current status information is acquired.

15. The communication system of claim 13, the first communication device further comprises:
a memory unit for storing an account of the calling party; and
a setting unit for correlating the phone number of the called party to identification data, wherein when the social network server authorizes the account, the first network transmission unit acquires the current status information of the called party according to the identification data.

16. The communication system of claim 13, wherein the network transmission unit acquires the current status information periodically.

17. The communication system of claim 13, wherein the first network transmission unit is responsive to the first call request for further sending an advertisement link to the second communication device through Internet.

18. The communication system of claim 13, the first communication device further comprises:
a positioning unit for calculating positioning data of the first communication device, wherein the first network transmission unit is responsive to the first call request for further sending the positioning data to the second communication device through Internet.

* * * * *